(12) United States Patent
Mayer

(10) Patent No.: US 10,325,374 B1
(45) Date of Patent: Jun. 18, 2019

(54) SYSTEM AND METHOD FOR SEGMENTING ID CARDS WITH CURVED CORNERS

(71) Applicant: MorphoTrust USA, LLC, Billerica, MA (US)

(72) Inventor: Joseph R. Mayer, Billerica, MA (US)

(73) Assignee: MorphoTrust USA, LLC, Billerica, MA (US)

(*) Notice: Subject to any disclaimer, the term of this patent is extended or adjusted under 35 U.S.C. 154(b) by 154 days.

(21) Appl. No.: 15/643,183

(22) Filed: Jul. 6, 2017

Related U.S. Application Data

(60) Provisional application No. 62/358,663, filed on Jul. 6, 2016.

(51) Int. Cl.
*G06K 9/34* (2006.01)
*G06T 7/13* (2017.01)
*G06T 7/11* (2017.01)

(52) U.S. Cl.
CPC .......... *G06T 7/13* (2017.01); *G06T 7/11* (2017.01); *G06T 2207/30176* (2013.01)

(58) Field of Classification Search
CPC ......... G06T 7/0081; G06T 2207/20144; G06T 7/0083; G06T 2207/10016; G06T 7/11; G06K 9/38; G03B 15/02; G03B 15/05; G03B 15/06; G03B 15/03; G03B 17/24; F21W 2134/406; A45C 13/42
See application file for complete search history.

(56) References Cited

U.S. PATENT DOCUMENTS

| | | | | |
|---|---|---|---|---|
| 4,248,510 A | * | 2/1981 | Baker | G03B 17/24 396/332 |
| 6,766,039 B1 | * | 7/2004 | Al-Sheikh | A45C 13/42 382/115 |

OTHER PUBLICATIONS

Canny, "A Computational Approach to Edge Detection," in Pattern Analysis and Machine Intelligence, IEEE Transactions on, vol. PAMI-8, No. 6, dated Nov. 1986, 20 pages.
Sobel, "History and Definition of the so-called Sobel Operator," more appropriately named the Sobel-Feldman Operator, dated Jun. 14, 2015, 6 pages.

* cited by examiner

*Primary Examiner* — Duy M Dang
(74) *Attorney, Agent, or Firm* — Fish & Richardson P.C.

(57) ABSTRACT

A computer-assisted method to segment an image of an identification document that includes: accessing data encoding the image of the identification document that includes four curved corners connected by four edges; applying gradient filters to the image of the identification document to generate an edge map that reveals candidate edges that are substantially horizontal or vertical relative to borders of the identification document, the gradient filters including gradient maps that reveal horizontal as well as vertical alterations of image intensities; accessing data encoding models representing an expected range of curved corners, each model quantifying both the radial and angular extents of the curved corners; identifying combinations of candidate edges, each combination including four candidate edges that are connected at four corners; and selecting a combination of candidate edges by applying the models to each of the four corners formed by the four candidate edges of each identified combination.

20 Claims, 5 Drawing Sheets

SYSTEM AND METHOD FOR SEGMENTING ID CARDS WITH CURVED CORNERS

RELATED APPLICATIONS

This application claims the benefit of U.S. provisional patent application Ser. No. 62/358,663 filed Jul. 6, 2016, the contents of which are incorporated by reference in their entirety for all purposes.

TECHNICAL FIELD

This document generally relates to image processing of ID cards.

BACKGROUND

Identification documents such as identification cards are widely used for authenticating a person. Photo images of identification documents can be taken for automatically processing.

SUMMARY

In one aspect, some implementations provide a computer-implemented method. The method includes: accessing, at a computing device, data encoding the image of an identification document that includes four curved corners connected by four edges; applying, by the computing device, gradient filters to the image of the identification document to generate an edge map that reveals candidate edges that are substantially horizontal or vertical relative to borders of the identification document, the gradient filters including gradient maps that reveal horizontal as well as vertical alterations of image intensities; accessing, at the computing device, data encoding models representing an expected range of curved corners, each model quantifying both the radial and angular extents of the curved corners; identifying, by the computing device, combinations of candidate edges, each combination including four candidate edges that are connected at four corners; and selecting, by the computing device, a combination of candidate edges by applying the models to each of the four corners formed by the four candidate edges of each identified combination such that a degree of match is quantified for each identified combination.

Implementations may include one or more of the following features.

Applying the models to each of the four corners of each identified combination may include: correlating a first model with areas corresponding to each of the four corners to determine a quantitative match for each corner; and summing the quantitative matches from all four corners to factor into the degree of match for the identified combination of four edges.

The method may further include: correlating, at areas corresponding to each of the four corners, a second model with the gradient maps to identify an overlap amount with the gradient filters; subtracting contributions of the overlap amount from the summed quantitative matches.

Correlating a first model with areas corresponding to each of the four corners to determine a quantitative match for each corner may include: dot multiplying direction vector data from the first model with gradient data from an area corresponding to a corner. The direction vector data may include data from both the horizontal direction and the vertical direction relative to borders of the identification document.

Correlating a second model with the gradient maps to identify an overlap amount with the gradient filters may include: component multiplying a filter of the second model with magnitude of the gradient data from a corner.

The method may further include ranking each identified combinations while selecting the combination of candidate edges. The method may further include applying weighting and normalization factors to the summation results to control ranges of the ranking and mitigate biases towards larger models. The method may further include constructing the models representing the expected range of curved corners. The method may further include: synthesizing a background on which the identification document is placed.

In another aspect, some implementations provide a computer system that includes a processor. The processor is configured to perform the operations of: accessing data encoding the image of the identification document that includes four curved corners connected by four edges; applying gradient filters to the image of the identification document to generate an edge map that reveals candidate edges that are substantially horizontal or vertical relative to borders of the identification document, the gradient filters including gradient maps that reveal horizontal as well as vertical alterations of image intensities; accessing data encoding models representing an expected range of curved corners, each model quantifying both the radial and angular extents of the curved corners; identifying combinations of candidate edges, each combination including four candidate edges that are connected at four corners; and selecting a combination of candidate edges by applying the models to each of the four corners formed by the four candidate edges of each identified combination such that a degree of match is quantified for each identified combination.

Implementations may include one or more of the following features.

Applying the models to each of the four corners of each identified combination may include: correlating a first model with areas corresponding to each of the four corners to determine a quantitative match for each corner; and summing the quantitative matches from all four corners to factor into the degree of match for the identified combination of four edges.

The processor may be further configured to perform the operations of: correlating, at areas corresponding to each of the four corners, a second model with the gradient maps to identify an overlap amount with the gradient filters; subtracting contributions of the overlap amount from the summed quantitative matches.

Correlating a first model with areas corresponding to each of the four corners to determine a quantitative match for each corner may include: dot multiplying direction vector data from the first model with gradient data from an area corresponding to a corner. The direction vector data may include data from both the horizontal direction and the vertical direction relative to borders of the identification document.

Correlating a second model with the gradient maps to identify an overlap amount with the gradient filters may include: component multiplying a filter of the second model with magnitude of the gradient data from a corner.

The processor may be configured to perform the operations of: ranking each identified combinations while selecting the combination of candidate edges. The processor may be further configured to perform the operations of: applying weighting and normalization factors to the summation results to control ranges of the ranking and mitigate biases towards larger models.

The processor may be configured to perform the operations of: constructing the models representing the expected range of curved corners. The computer system may further comprise a camera device configured to capture the image of the identification document.

Some implementations may include one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Identification documents such as driver's licenses serve as foundation of identity proof in our daily lives. The identification documents can be automatically processed when photos have been taken from such identity documents. These photos may be taken when an identification document lays on a background, for example, a table, a supporting surface, a cloth, etc. Automatic processing of these photos may start with a segmentation process that extracts the identification document from the background. Edge detection techniques may incorporate straight-line fitting that can detect, with relative ease, straight boundaries of an ID card in an image. In these techniques, four boundaries may then be combined to define a rectangular card outline for a simple card segmentation algorithm. However, if the background or the contents of the card itself contain straight edge boundaries, a naïve segmentation approach may fail, thereby incorrectly triggering on edges other than the card boundaries. Improvements in these techniques may advantageously leverage the shape of rounded corners of common identification cards to render the segmentation process more robust. In such implementations representing the more advantageous features, multiple models may be constructed each describing a rounded corner with a particular radius.

Figure 1:
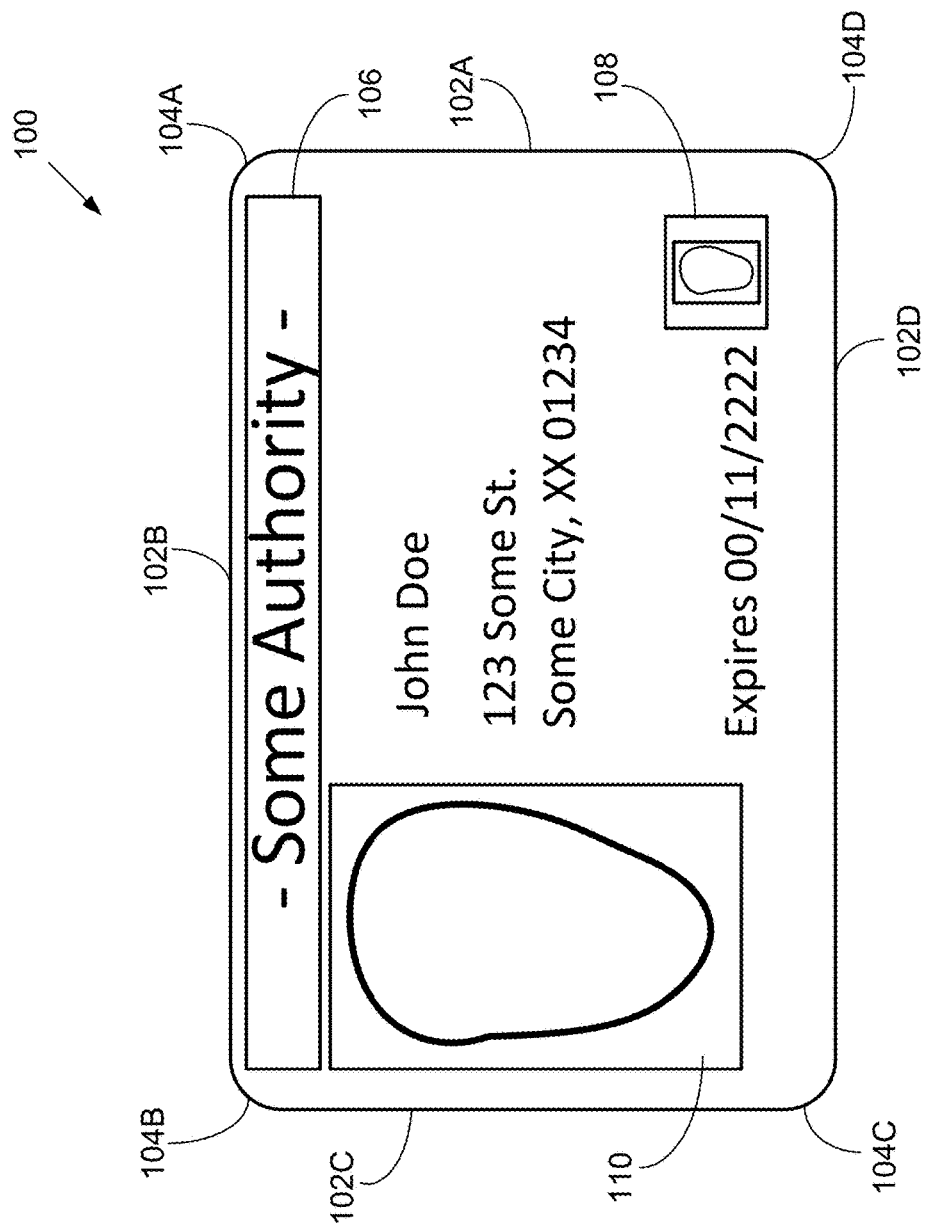
FIG. 1 illustrates an example of an identification document on a background for a photo to be taken, based on which segmentation will be performed.

FIG. 1 illustrates an example of an identification document 100 which may be laying on a background so that a photo to be taken from, for example, a camera device. Based on the photo, segmentation can be performed so that additional processing may ensue. This example shows a driver's license of a subject "John Doe" from a state authority. This driver's license rests on background when the photo image of the driver's license is taken. The photo image can be from a still camera, or a frame from an image feed taken by a video camera. In some examples, the background is from a table cloth, a table surface, a metal surface, or a glass surface. The background can show up glossy, with specular reflections, or including noisy speckle appearance. As automated processing may initiate from segmentation of the driver's license from the background, subsequent processing may depend on high-quality and high-fidelity delineation of the boundaries. For example, some implementations may search for "hidden," covert, or non-obvious features on the card at exact locations relative to the card edge. To zero in on such relative locations with precision, an accurate delineation of the card boundary can become imperative.

As shown in the example of FIG. 1, the driver's license 100 has four edges, namely, 102A, 102B, 102C, and 102D. Four rounded corners, 104A to 104D, connect the four edges. Three high-contrast rectangular regions are visible on the front of the driver's license 100. The three regions include, upper region 106 indicating the state authority that has issued the driver's license 100, lower region 108 where a smaller biometric of the subject is embedded, and left region 110 where a larger biometric of the subject is embedded. These high-contrast rectangular regions may include their own edges that can add to the complexity of automatic detection of card boundaries. While this example only shows the front of driver's license 100, the back side of the driver's license may also be analyzed similarly by image processing. In some cases, magnetic stripes can be located on the back side of the driver's license that can give rise to the same type of segmentation challenges when the borders of the magnetic stripes are easily conflated with those of the driver's license itself. By the same token, areas where 2-D bar code (e.g., on the back side of the driver's license) are located may present similar challenges to automatic segmentation.

In the above examples, once the card boundaries are detected, image analysis may be performed on the extracted driver's license. The image processing techniques may include optical character recognition (OCR) for processing of textual information, image recognition for facial recognition, or steganography features. These image processing techniques can depend on high-resolution segmentation as the features being analyzed may be located at precise locations relative to the card boundaries. When the card boundaries are identified even slightly off from the true boundaries there will be a rippling effect on the downstream processing to identify features or characters automatically. In some instances, slightly off could mean fewer than a few pixels off. In one example, OCR may be performed on erroneously classified texts. Indeed, it can be problematic for downstream process to function the same way and generate the same result if the boundaries are not precisely located.

Some implementations may initiate with the construction of an array of models that describe and characterize the rounded card corners with, for example, an expected range of radii, an expected range of angles, or an expected set of curvature shapes. This array of models can be utilized to assist accurate determination and selection of card borders by rendering false corners more easily removed. The false corners may result from connecting spurious card edge candidates. For example, blocks of color on the front or back of an identification card, or blocks of solid color within the background may trigger false card edge detection and errant card segmentation candidates. These blocks and subsequent false boundary candidates can have sharp corners, as illustrated by corners 106, 108 and 110 in FIG. 1. As explained below, the curved corner models can be applied to expose these sharp corners as evidence of erroneous segmentation.

Figure 2:
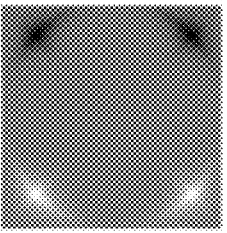
FIG. 2 shows examples of various models to facilitate accurate determination of curved corners.
Figure 2:
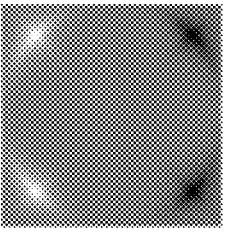
Figure 2:
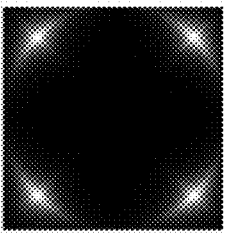
Figure 2:
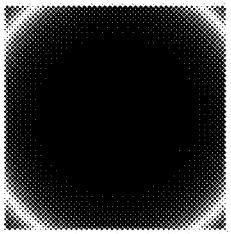
Figure 2:
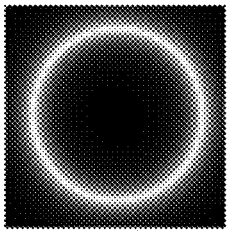
Figure 2:
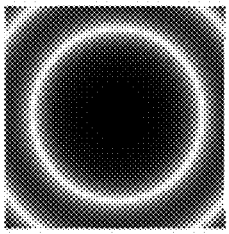

Referring to FIG. 2, various examples of models are shown. These models may facilitate determination of curved corners. Each model in the collection may include three square images with sides equal to twice the radius of the card corner to be detected. The first two images pertain to component images. The third is a composite image based on the first two component images.

Starting with the component images, a wide (more than 1 pixel in width) ring is calculated with its reference radius equal to the target corner radius. At each point on the ring, a direction vector pointing towards the center is calculated. The magnitude of each direction vector is attenuated by two exponential functions. The first exponential function has a first attenuation factor and falls off radially relative to the reference radius. This may allow the model to favor corners that fit perfectly while maintaining some degree of tolerance to variations. The second exponential function has a second attenuation factor and falls off angularly within each quadrant, centered at each 45-deg mark. This attenuation can reduce the sensitivity of the model for detecting non-curved corners. As these non-curved corners fit the horizontal and vertical parts of the model closely, these non-curved corners may need to be suppressed. The X and Y components of the direction vectors are stored each in one of the square images associated with the model. Image 202-1 shows the X component of an example of a ring from a model in one implementation. Image 202-2 shows the companion Y component of the example of the ring from the same model in the implementation. For completeness, image 204 shows the combined magnitude of the X and Y components. These image matrices are used to perform a dot-product multiplication with the gradient maps generated from an image of the license card at sample corner locations to determine the degree of similarity between the sample area and the desired corner.

Image 210-3 is another square image that includes the sum of two additional rings, one slightly larger and one slightly smaller than the target radius. For image 210-3, a magnitude is associated with these two rings, rather than the X, Y components. Each of the two rings is constructed using values from the radial-decay exponential function as described above for the component images but without the angular decay function. These two rings constitute a garbage filter which will be used to adjust the corner score. There are samples which happen to fit the desired corner shape as described above, but only because they contain a large amount of gradient noise. These samples will have their overall score reduced by the amount of gradient magnitude that overlaps with this garbage filter.

Figure 3:
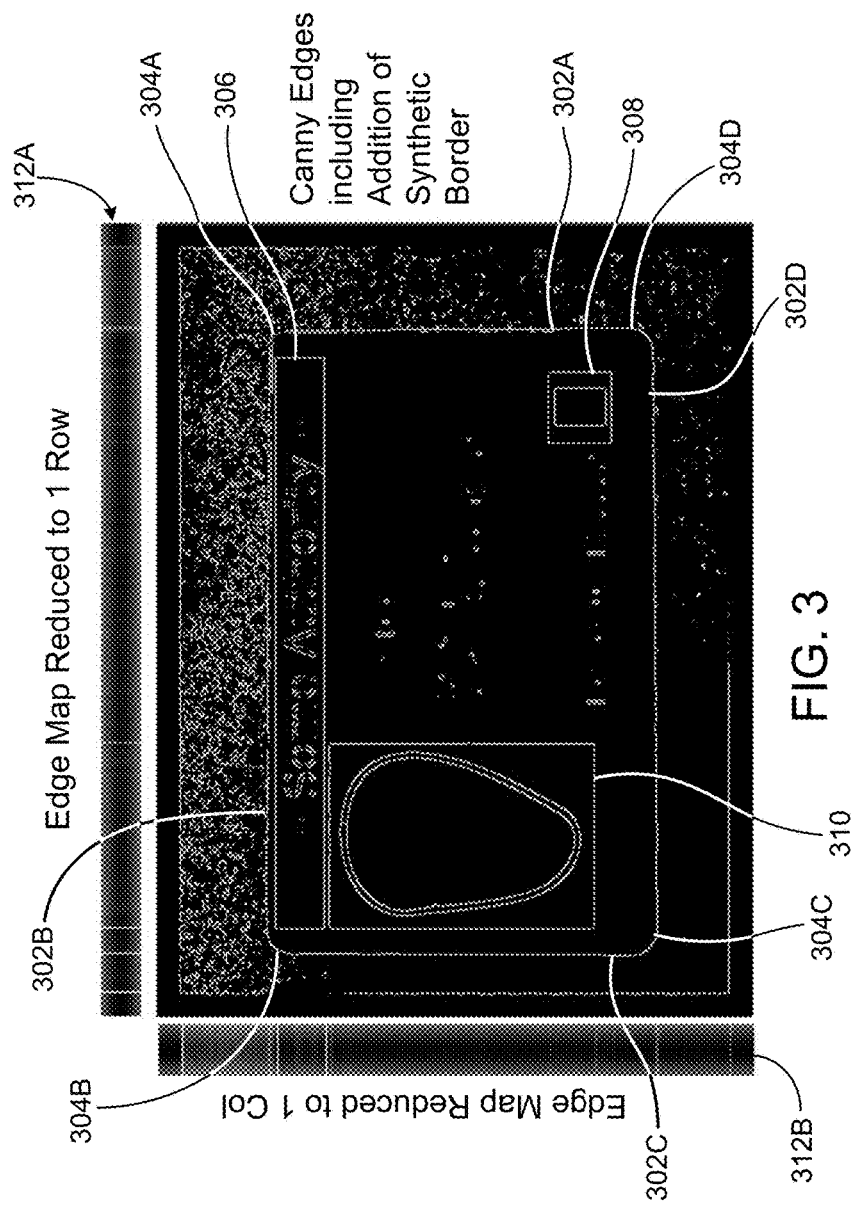
FIG. 3 shows one example of an edge map as the edges are being detected during a segmentation process.

A Canny edge map and Sobel X and Y gradient maps may be extracted from the grayscale representation of the input image of the license card on a background, as illustrated in FIG. 3. A synthetic border may be added to allow for detection of card edges that are found along the edges of the image sample itself. In some implementations, this border is created by embedding the original image in the center of a larger image. The background may be filled with a solid color or noise. The color for the background may be fixed or may be derived from an averaging of pixel values along the edges of the original image. The latter approach may reduce creation of new artificial edges in the gradient map. If a card is slightly out-of-frame, with a border just outside the bounds of the original image, adding this extra margin area will allow for detecting edges, calculating corner locations from intersections and applying curved corner model evaluations that may otherwise be impossible due to off-image pixel indexing in the original image. An example of this processing result is shown in FIG. 3. Here, Canny edges 302A to 302D are delineated, along with detected corners 304A to 304D. Notably, the Canny edges 302A to 302D are generally not straight lines as would be expected from the physical card. These imperfections can cause difficulties for downstream processing. In particular, Canny edge 302B contains broken portions. This break in continuity can render it difficult to determine the location of features on the card relative to this border. This break can be caused by the appearance of the background bordering the area above the card. In this sense, this background may function as noise in the edge map. Low contrast along the top border of the card and the background may also result in a poorly defined edge at 302B. Because the boundaries of area 306 are so close to the border line of the card itself, this confusion can provide an additional source of error.

In some implementations, long straight edges may be identified on top, bottom, left and right sides of the image. For example, the long straight edges may be identified as candidate edges for further triage. In one example, the matrix representation of the Canny edge map shown in FIG. 3 can be collapsed to one row and one column by summing in the reduction direction. This reduction in dimension may then enable a search for peaks (or maxima) in 1D grayscale representations. An example of a reduction in the column direction can be found in row 312A, showing various spikes that correspond to locations of intensity build-ups. Likewise, column 312B shows a reduction in the row direction. This reduction likewise amplifies the intensity at edge locations as intensity spikes. The lines at these locations may be treated as candidate edges. This reduction operation can be performed using multiple rotated variants of the input image to detect edges at a variety of angles.

Figure 4:
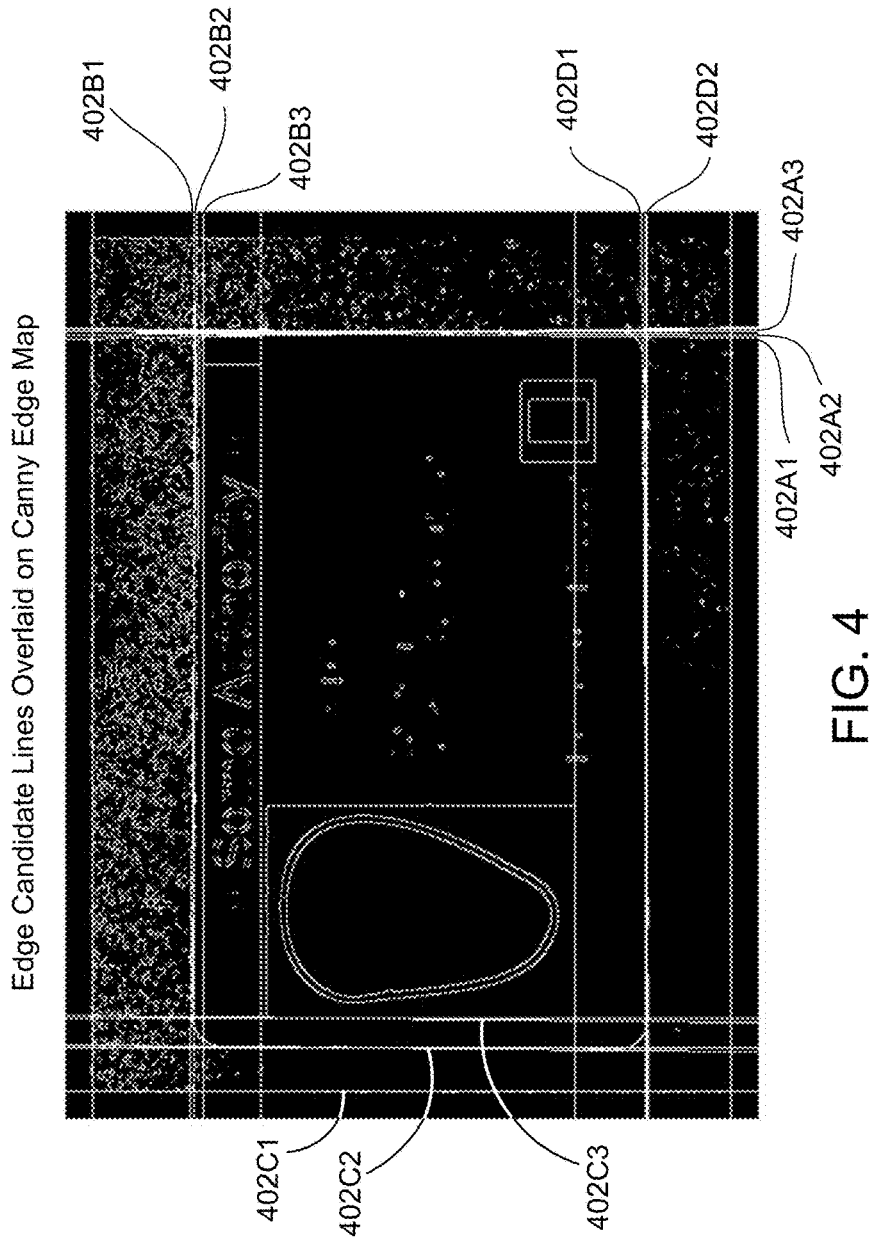
FIG. 4 shows examples of candidate edges overlaid on Canny edge map from FIG. 3.

FIG. 4 shows examples of candidate boundary lines overlaid on Canny edge map from FIG. 3. Here, candidate boundary lines 402A1 to 402A3 are identified and overlaid around the putative border 302A. These candidate boundary lines represent options to fine tune the segmentation so that a more accurate determination can be reached. Similarly, candidate boundary lines 402B1 to 402B3 are identified and overlaid around the presumptive border 302B; candidate boundary lines 402C1 to 402C3 are identified and overlaid around the presumptive border 302C; and candidate boundary lines 402D1 to 402D2 are identified and overlaid around the presumptive border 302D. The process may identify more than the above-listed candidate border lines. For example, other candidate border lines are identified around areas 306, 308, and 310.

A fine-grained analysis may then evaluate the combinations of these edges to weed out the less likely candidates. In some implementations, the four lines from a particular combination may be evaluated by calculating the intersection points among the four lines that define the four corners. Subsequently, a quantitative score can be generated by comparing/correlating each putative corner to the available corner models and summing the results from all four corners.

In more detail, the corner-score calculations may be performed by extracting a square at the corner in question from Sobel X and Sobel Y gradient maps of the original image with side length equal to expected corner radius of current model under consideration. Once the square has been extracted, the applicable quadrant from the active model X and Y component rings associated with the corner being tested can also be extracted. For example, top-left card corners can be matched against top-left quadrant of the model. At this point, a dot-product of the Sobel gradient data with the model direction vector data may be performed and the result may be summed for all matrix elements. Likewise, the applicable quadrant from the active model garbage filter ring can be extracted from the same spatial locales. The model garbage filter may then be component multiplied with the magnitude of the input image gradient (Sobel Magnitude) at the corner location. The results may then be summed over all matrix elements. The corner's overall score against the active model can be quantified by subtracting the result of the garbage filter from the result of the component (X, Y) rings. Weighting and normalization factors may be added to the summation results of the component rings such that score range can be controlled and bias towards larger models scoring higher can be mitigated. In some implementations, the score calculation may be performed for each and every combination of the four candidate boundaries. In the examples of FIG. 4, scores from all combinations of candidate boundary lines 402A1 to 402A3, 402B1 to 402B3, 402C1 to 402C3, and 402D1 to 402D2 can be computed and ranked. The combination corresponding to the highest score may be retained as the chosen segmentation results. In other words, the final card segmentation is chosen as the combination of Top, Right, Bottom and Left edges that produces corresponding four corners with the largest sum of model matching score.

Figure 5:
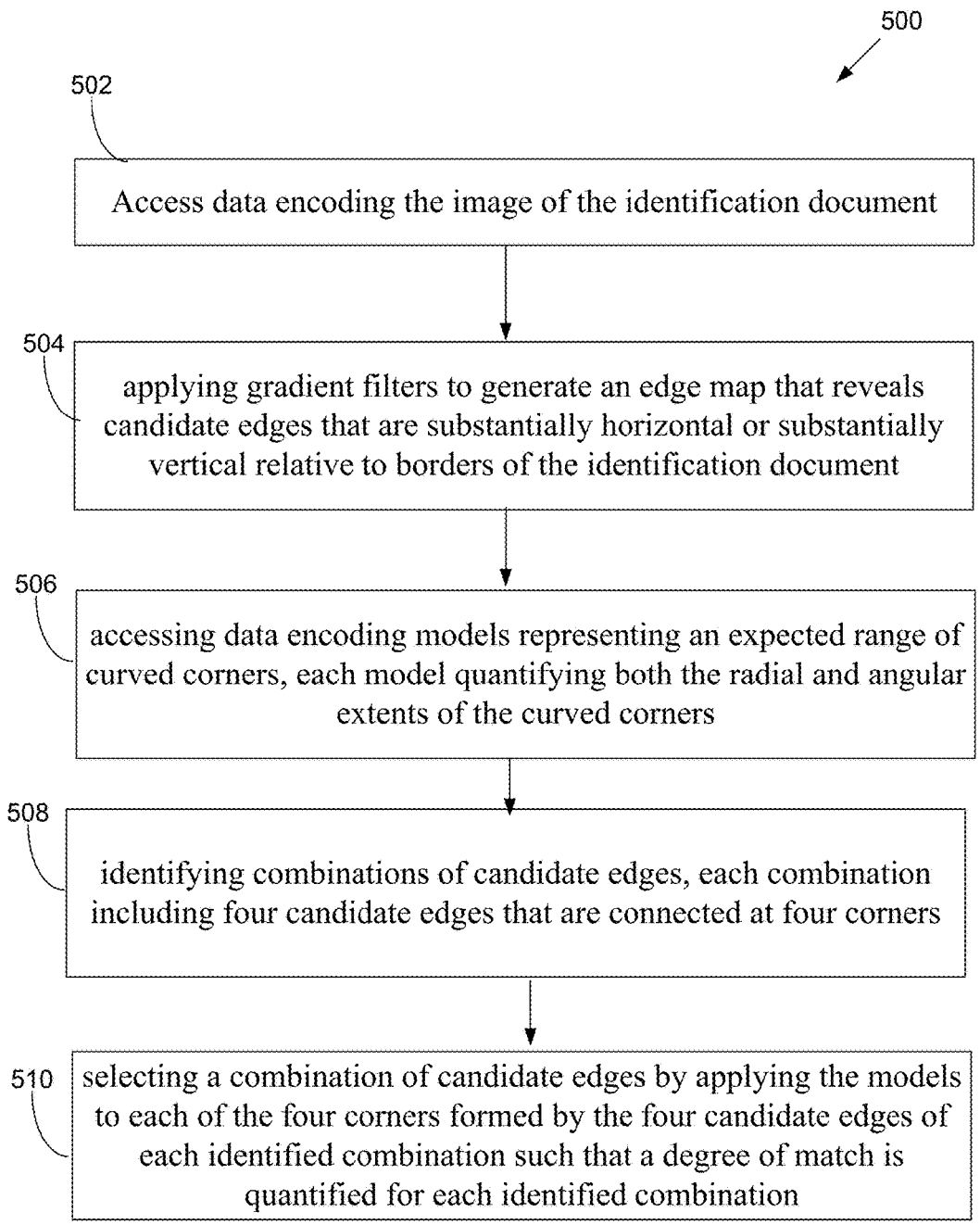
FIG. 5 shows an example of process for segmenting an identification document from a background.

FIG. 5 shows an example of a flow chart that describes a typical process flow. A camera device may capture a photo image of an identification document, such as a driver's license or a passport. The identification document may be laying on a background, such as a fabric or a table surface. Data encoding the photo image may then be transmitted to a computing device for centralized processing in accordance with relevant protocols. The computing device may access such data encoding the photo image (502). The computing device may analyze the data by applying gradient filters to generate an edge map that reveals candidate edges that are substantially horizontal or vertical relative to borders of the identification document (504). The gradient filters incorporate gradient maps that reveal horizontal as well as vertical alterations of image intensities. In some implementations, the gradient filtering may include Sobel X and Sobel Y gradient maps adapted to calculate edges. For example, the Sobel X and Sobel Y gradient maps may be calculated based on the original image with side length equal to expected corner radius of constructed models.

The computing device may then access data encoding models representing an expected range of curved corners (506). Each model may quantify both the radial and angular extents of the curved corners. These models characterize curve corners with particular radial and angular ranges. In some implementations, the computing device are configured to construct these models that zero in on a particular range of radial coverage.

The computing device may then identify combinations of candidate edges (508). Each combination include four candidate edges that are connected at four corners. The combinations may be ranked by applying the models to each of the four corners formed by the four candidate edges of each identified combination (510). In this ranking, a degree of match is quantified for each identified combination by summing over each corner. The quantification may include subtracting the result of the garbage filter from the result of the component rings.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer—such as a mobile device—having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-assisted method to segment an image of an identification document, comprising:
   accessing, at a computing device, data encoding the image of the identification document that includes four curved corners connected by four edges;
   applying, by the computing device, gradient filters to the image of the identification document to generate an edge map that reveals candidate edges that are substantially horizontal or vertical relative to borders of the identification document, the gradient filters including gradient maps that reveal horizontal as well as vertical alterations of image intensities;
   accessing, at the computing device, data encoding models representing an expected range of curved corners, each model quantifying both the radial and angular extents of the curved corners;
   identifying, by the computing device, combinations of candidate edges, each combination including four candidate edges that are connected at four corners; and
   selecting, by the computing device, a combination of candidate edges by applying the models to each of the four corners formed by the four candidate edges of each identified combination such that a degree of match is quantified for each identified combination.

2. The computer-assisted method of claim 1, applying the models to each of the four corners formed by the four candidate edges of each identified combination comprises:
   correlating a first model with areas corresponding to each of the four corners to determine a quantitative match for each corner; and
   summing the quantitative matches from all four corners to factor into the degree of match for the identified combination of four edges.

3. The computer-assisted method of claim 2, further comprising:
   correlating, at areas corresponding to each of the four corners, a second model with the gradient maps to identify an overlap amount with the gradient filters; and
   subtracting contributions of the overlap amount from the summed quantitative matches.

4. The computer-assisted method of claim 3, wherein correlating a second model with the gradient maps to identify an overlap amount with the gradient filters comprises:
   component multiplying a filter of the second model with magnitude of the gradient data from a corner.

5. The computer-assisted method of claim 2, wherein correlating a first model with areas corresponding to each of the four corners to determine a quantitative match for each corner comprises:
   dot multiplying direction vector data from the first model with gradient data from an area corresponding to a corner.

6. The computer-assisted method of claim 5, wherein the direction vector data includes data from both the horizontal direction and the vertical direction relative to borders of the identification document.

7. The computer-assisted method of claim 2, further comprising:
   ranking each identified combinations while selecting the combination of candidate edges.

8. The computer-assisted method of claim 7, further comprising:
   applying weighting and normalization factors to the summation results to control ranges of the ranking and mitigate biases towards larger models.

9. The computer-assisted method of claim 1, further comprising:
   constructing the models representing the expected range of curved corners.

10. The computer-assisted method of claim 1, further comprising:
    synthesizing a background on which the identification document is placed.

11. A computer system comprising a processor, wherein the processor is configured to perform the operations of:
    accessing data encoding the image of the identification document that includes four curved corners connected by four edges;
    applying gradient filters to the image of the identification document to generate an edge map that reveals candidate edges that are substantially horizontal or vertical relative to borders of the identification document, the gradient filters including gradient maps that reveal horizontal as well as vertical alterations of image intensities;
    accessing data encoding models representing an expected range of curved corners, each model quantifying both the radial and angular extents of the curved corners;
    identifying combinations of candidate edges, each combination including four candidate edges that are connected at four corners; and
    selecting a combination of candidate edges by applying the models to each of the four corners formed by the four candidate edges of each identified combination such that a degree of match is quantified for each identified combination.

12. The computer system of claim 11, wherein applying the models to each of the four corners formed by the four candidate edges of each identified combination comprises:

correlating a first model with areas corresponding to each of the four corners to determine a quantitative match for each corner; and summing the quantitative matches from all four corners to factor into the degree of match for the identified combination of four edges.

13. The computer system of claim 12, wherein the processor is further configured to perform the operations of:

correlating, at areas corresponding to each of the four corners, a second model with the gradient maps to identify an overlap amount with the gradient filters; and subtracting contributions of the overlap amount from the summed quantitative matches.

14. The computer system of claim 13, wherein correlating a second model with the gradient maps to identify an overlap amount with the gradient filters comprises:

component multiplying a filter of the second model with magnitude of the gradient data from a corner.

15. The computer system of claim 12, wherein correlating a first model with areas corresponding to each of the four corners to determine a quantitative match for each corner comprises:

dot multiplying direction vector data from the first model with gradient data from an area corresponding to a corner.

16. The computer system of claim 15, wherein the direction vector data includes data from both the horizontal direction and the vertical direction relative to borders of the identification document.

17. The computer system of claim 12, wherein the processor is further configured to perform the operations of:

ranking each identified combinations while selecting the combination of candidate edges.

18. The computer system of claim 17, wherein the processor is further configured to perform the operations of:

applying weighting and normalization factors to the summation results to control ranges of the ranking and mitigate biases towards larger models.

19. The computer system of claim 11, wherein the processor is further configured to perform the operations of:

constructing the models representing the expected range of curved corners.

20. The computer system of claim 11, further comprising a camera device, wherein the camera device is configured to capture the image of the identification document.

* * * * *